United States Patent
Tanaka et al.

[11] Patent Number: 5,453,244
[45] Date of Patent: Sep. 26, 1995

[54] ALUMINUM ALLOY BEARING

[75] Inventors: Tadashi Tanaka, Konan; Masaaki Sakamoto, Nagoya; Tohru Kato, Seto; Yoshiaki Sato, Gifu, all of Japan

[73] Assignee: Daido Metal Company Ltd., Nagoya, Japan

[21] Appl. No.: 337,140

[22] Filed: Nov. 10, 1994

Related U.S. Application Data

[63] Continuation of Ser. No. 91,287, Jul. 15, 1993, abandoned.

[30] Foreign Application Priority Data

Jul. 16, 1992 [JP] Japan ..................... 4-189524

[51] Int. Cl.⁶ .................... C22C 21/10
[52] U.S. Cl. .............. 420/532; 148/439; 420/535; 420/537; 420/538; 420/541; 420/543; 420/544; 420/545; 420/546; 420/547; 420/549; 420/551; 420/552; 420/553; 428/645; 428/653; 428/654; 428/681
[58] Field of Search .................. 420/532, 535, 420/537, 538, 541, 543, 544, 545, 546, 547, 549, 551, 552, 553; 148/439; 428/653, 654, 645, 681

[56] References Cited

U.S. PATENT DOCUMENTS 3,785,807  1/1974  Backerud ................. 420/552
5,028,393  7/1991  Tanaka et al. ............. 420/532

FOREIGN PATENT DOCUMENTS 3-6345  1/1991  Japan .

Primary Examiner—David A. Simmons
Assistant Examiner—Robert R. Koehler
Attorney, Agent, or Firm—Browdy and Neimark

[57] ABSTRACT

There is disclosed a novel aluminum alloy bearing which exhibits a more excellent fatigue resistance than conventional bearings even under such conditions of use as at a high temperature and under a high load. The aluminum alloy bearing has an aluminum bearing alloy layer containing, by weight, 1 to 10% Zn, 0.1 to 5% Cu, 0.05 to 3% Mg, 0.1 to 2% Mn, 0.1 to 5% Pb, 0.1 to 2% V, and 0.03 to 0.5% in total of Ti—B, and further may optionally contain not more than 8% Si, 0.05 to 0.5% Sr, and Ni, Co and Cr. The alloy may be bonded to a steel metal back sheet, and a surface layer may be formed on the surface of the bearing. By use of the composition of the alloy of the invention, the fatigue resistance of the aluminum alloy bearings has been improved, and such an improved bearing can fully achieve a bearing performance even under severe conditions of use as at high temperature and under a high load.

1 Claim, 4 Drawing Sheets

FIG. 2

RESULT OF FATIQUE TEST OF SODA TYPE

| SAMPLE NO. | MAXIMUM WITHOUT FATIGUE (kgf/cm²) |
|---|---|
| SAMPLES OF THE PRESENT INVENTION | |
| 1 | ~650 |
| 2 | ~650 |
| 3 | ~680 |
| 4 | ~670 |
| 5 | ~660 |
| 6 | ~660 |
| 7 | ~650 |
| 8 | ~660 |
| 9 | ~650 |
| 10 | ~650 |
| 11 | ~650 |
| 12 | ~650 |
| 13 | ~680 |
| 14 | ~680 |
| 15 | ~670 |
| 16 | ~660 |
| 17 | ~660 |
| 18 | ~660 |
| 19 | ~660 |
| PRIOR ART SAMPLE | |
| 20 | ~400 |
| 21 | ~300 |
| 22 | ~400 |
| 23 | ~560 |
| 24 | ~560 |
| 25 | ~500 |

SHAPE OF TEST PIECE FOR FATIQUE TEST

LOAD PATTERN IN FATIQUE TEST

ALUMINUM ALLOY BEARING

This application is a continuation of application Ser. No. 08/091,287, filed Jul. 15, 1993, now abandoned.

BACKGROUND OF THE INVENTION

This invention relates to an aluminum alloy bearing for use mainly in an internal combustion engine of an automobile which bearing exhibits an excellent fatigue resistance even under such severe conditions of use as being compact in size and lightweight design for fuelsaving purposes, or as a high-speed or a high-engine speed design for achieving a high performance.

Al—Sn alloy, Al—Si—Sn alloy, Al—Zn alloy and Al—Zn—Si alloy have heretofore been used to form an aluminum alloy bearing for an internal combustion engine. Particularly, a bearing of an Al—Zn—Si alloy related to the present invention is disclosed in Japanese Patent Application No. 1-140284 filed earlier by the assignee of the present application.

Recently, however, as regards the condition of use of internal combustion engines, a compact and lightweight design for fuel-saving purposes as well as a high output design has been required, and the engines have been used in a more severe environment as at higher temperatures, at higher speed and under a higher load. As a result, the fatigue resistance achieved by the conventional bearing material, such as Al—Sn alloy, Al—Si—Sn alloy, Al—Zn alloy and Al—Zn—Si alloy, has become inadequate.

Moreover, in the case of the conventional material, such for example as the Al—Si—Cd alloy, when an overlay becomes worn, a problem with respect to a seizure resistance arises, and also the special element, Cd, contained in the material, poses a problem from the viewpoint of pollution. In an internal combustion engine designed for making it possible to operate at high speed under a high load, a film of lubricating oil becomes thin, so that a fatigue resistance and a seizure resistance become inadequate. The earlier-filed Japanese Patent Application No. 1-140284 is directed to an invention which improves such inadequate fatigue resistance and seizure resistance; however, this earlier invention has now become insufficient in fatigue resistance under more severe conditions of use.

SUMMARY OF THE INVENTION

The present invention seeks to overcome the above problems of the prior art, and an object of the invention is to provide a novel aluminum alloy bearing which exhibits a more excellent fatigue resistance even under severe conditions of use (i.e., at high temperatures at high speed under a high load) than the conventional alloy bearings.

The object of the present invention has been achieved by a material containing, as essential components, Al, Zn, Cu and further Mg, Mn, Pb, V and Ti—B, in which (1) the strength of the matrix is increased by the addition of Mn and V, and (2) Ti—B or Ti—B plus Sr is added to make the structure fine in grain size and to enhance the fatigue strength.

The present invention is directed to an aluminum alloy bearing. More specifically, according to the present invention, there is provided an aluminum alloy bearing having a bearing alloy layer consisting, by weight, of 1 to 10% Zn, 0.1 to 5% Cu, 0.05 to 3% Mg, 0.1 to 2% Mn, 0.1 to 5% Pb, 0.1 to 2% V, 0.03 to 0.5% in total of Ti+B, the balance Al and incidental impurities.

The bearing alloy layer may further contain not more than 8% Si.

The bearing alloy layer may further contain 0.05 to 0.5% Sr.

The bearing alloy layer may further contain at least one kind of 0.05 to 5% selected from the group consisting of Ni, Co and Cr.

The bearing alloy layer may be pressure-bonded to a steel back metal layer.

An intermediate bonding layer of Al or an Al alloy may be interposed between and bonded to the bearing alloy layer and the steel back metal layer.

An overlay of a lead alloy may be formed on a surface of the bearing alloy layer.

The reasons why the constituents should be limited to their respective specified values in the appended claims will be explained in the following:

(1) Zn: 1 to 10 wt.%

[1] Zn is in a solid-solution state in the Al matrix to change a space lattice interval to lower the adhesion property of Al. [2] Zn is preferentially oxidized with respect to Al to remove the harm of a hard Al oxide film. [3] Zn enhances the affinity for lubricating oil.

If the amount of addition of Zn is less than 1%, the seizure resistance and the fatigue resistance become inferior. If the Zn content is more than 10%, the risk of stress corrosion cracking occurs, and besides the toughness is lowered, and further where the overlay of a soft material is formed on the surface of the above alloy, the bonding property, for example with respect to electroplating, is adversely affected. Moreover, the pressure bonding property with respect to rolling is adversely affected. Therefore, the Zn content is limited to 1 to 10 wt.%.

Preferably, this content is in the range of 2 to 8 wt.%.

(2) Mg: 0.05 to 3 wt.%

Mg is in a solid-solution state in the Al matrix, or is precipitated as an intermetallic compound, thereby enhancing the fatigue strength.

If the amount of addition of Mg is less than 0.05%, no effect is achieved by such addition. If this content exceeds 3%, the alloy becomes too hard, so that the compatibility and toughness become inferior. And besides, the rolling property of the Al alloy is adversely affected.

(3) Mn: 0.1 to 2 wt.%

Mn is in a solid-solution state in the Al matrix, or is precipitated as an intermetallic compound, thereby improving mechanical properties at high temperatures.

If the amount of addition of Mn is less than 0.1%, no effect is achieved by such addition. If this content exceeds 2%, the intermetallic compound is coarsened to make the alloy brittle. And besides, the rolling property of the Al alloy is adversely affected.

(4) Pb: 0.1 to 5 wt.%

Pb improves the cutting performance and the seizure resistance.

If the amount of addition of Pb is less than 0.1%, no effect is achieved by such addition. On the other hand, if this content exceeds 5%, it is difficult for Pb to be dispersed uniformly in the Al matrix, and besides the strength is lowered.

(5) Cu: 0.1 to 5 wt.%

Cu increases the strength of the Al matrix, and improves the fatigue resistance.

If the amount of addition of Cu is less than 0.1%, no effect is achieved by such addition. If this content exceeds 5%, the alloy becomes too hard, and the compatibility is adversely affected, and besides the toughness is lowered.

(6) Sr: 0.05 to 0.5 wt.%

Sr causes Si to be finely crystallized, and is effective in improving mechanical properties (particularly, elongation).

If the amount of addition is less than 0.05%, no effect is achieved. If this content exceeds 0.5%, the ductility is lowered.

(7) Ti+B: 0.03 to 0.5% in total

A hard intermetallic compound of $TiB_2$ is formed from a part of the Ti +B, and is dispersed uniformly to enhance the strength of the alloy, and also to make the structure fine in grain size.

If the total amount of Ti and B is less than 0.03%, the above effects can not be achieved. If this amount exceeds 0.5%, the alloy becomes brittle to adversely affect plastic workability.

(8) Si: not more than 8%

[1] Si particles of high hardness (Hv about 600) are dispersed and as a result only the soft Al matrix at the surface is worn, so that the surface is microscopically rugged to have fine pits and projections. Si at the projections enables the alloy to withstand a high load while maintaining a property against adhesion (adhesion resistance). The pits perform such a function as achieved by an oil sump, and enable the alloy to withstand a high load and a metallic contact, and also enables the alloy to function well with a thin oil film.

[2] When the Al matrix is brought into metal-tometal contact with a mating shaft for a moment, the seizure of the bearing alloy is prevented because of the adhesion resistance of Si on the surface and the non-flowability of the Al matrix which non-flowability is brought about by Si existing therein as nuclei.

(9) V: 0.1 to 2 wt.%

V is in a solid-solution state in the Al matrix, or is precipitated as an intermetallic compound, thereby improving mechanical properties at high temperatures.

If the amount of addition of V is less than 0.1%, no effect is achieved by such addition. If this content exceeds 2%, the intermetallic compound becomes coarsened, and the ductility is adversely affected.

(10) At least one kind of Ni, Co and Cr: 0.05 to 5%

One or more of these substances are in a solidsolution state in the Al matrix, or form an intermetallic compound by precipitation, thereby increasing the strength of the alloy to enhance the fatigue resistance.

If this content is less than 0.05%, no effect is achieved. If this content exceeds 5%, the alloy becomes brittle, and the toughness and the ductility are lowered.

BRIEF DESCRIPTION OF THE DRAWINGS

FIG. 2 is a diagrammatic illustration showing fatigue characteristics of the alloys of the present invention and the conventional alloys;

DESCRIPTION OF THE INVENTION

The present invention will now be described more specifically by way of the following Examples.

EXAMPLE 1

Each of alloys having respective compositions shown in Table 1 was melted at 700° to 800° C., and was formed by continuous casting into a billet having a thickness of 1 inch and a width of 270 mm.

This billet was annealed at 350° to 450° C., and after the surface was cut, the billet was rolled.

Figure 3:
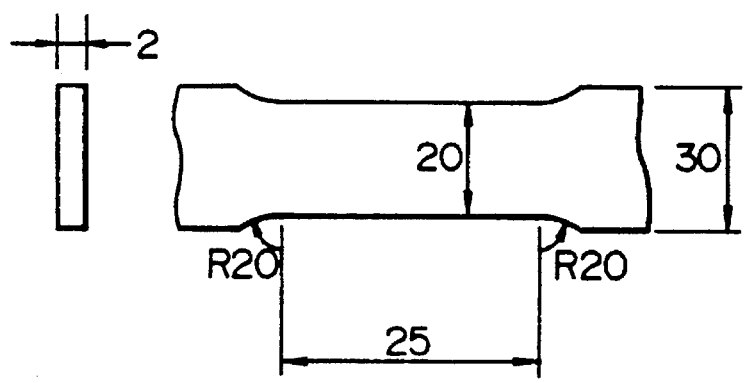
FIG. 3 is a view showing a configuration of a test piece.
Figure 4:
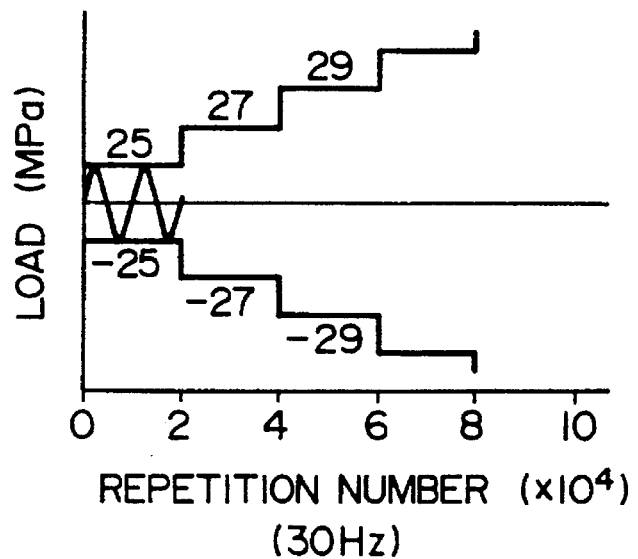
FIG. 4 is a diagram showing a load pattern in a fatigue test.

The annealing and the rolling were further repeated to finish the product into a predetermined size. Thus, bearing alloy strips relating to the present invention (Sample Nos. 1 to 19) and conventional alloy strips (Sample Nos. 20 to 25) shown in Table 1 were obtained. Test pieces shown in FIG. 3 were formed from these alloy strips, and in order to compare their fatigue strengths with one another, fatigue tests were conducted by a fatigue test machine according to a load pattern shown in FIG. 4.

Figure 1:
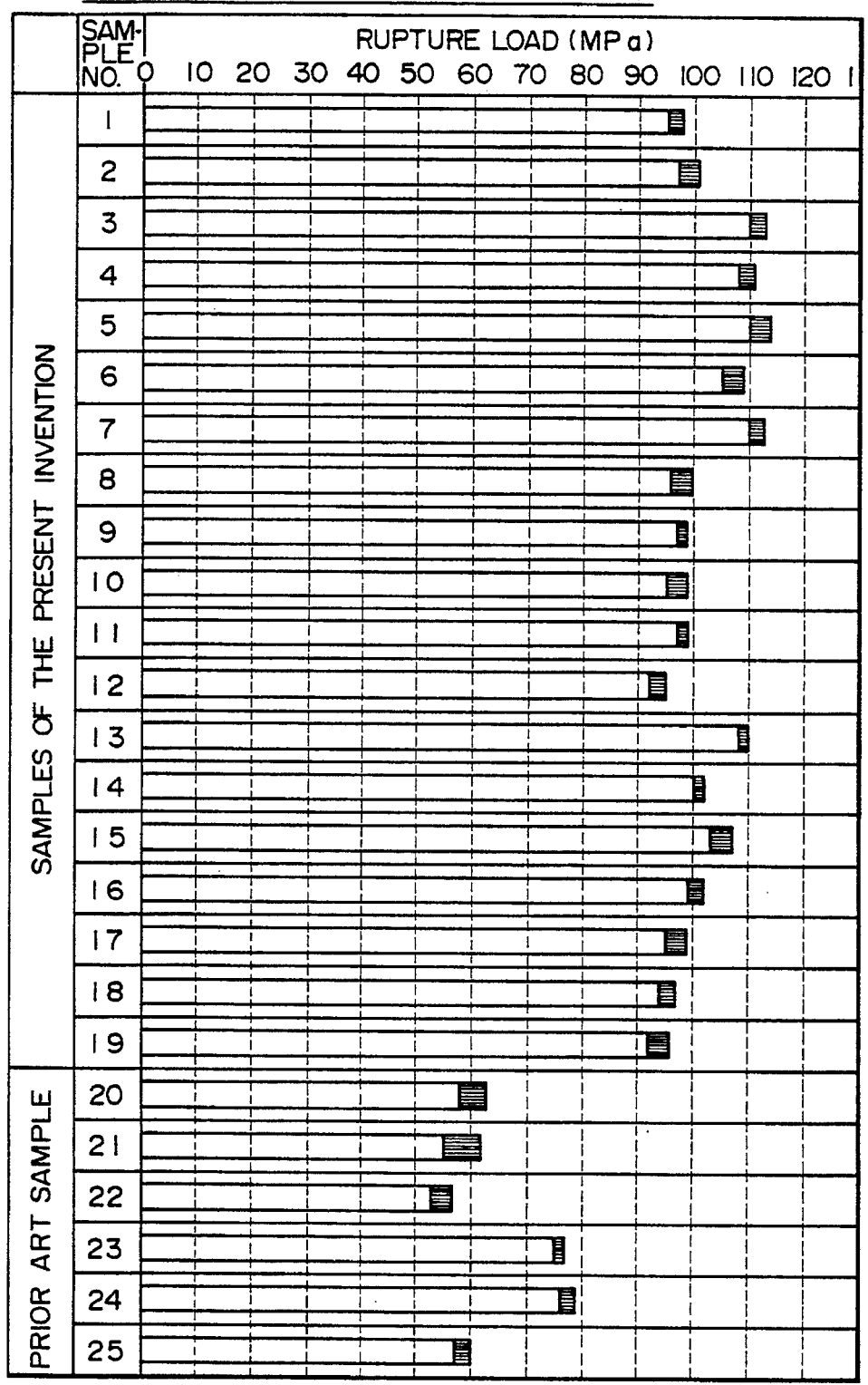
FIG. 1 is a diagrammatic illustration showing fatigue strength of strips of alloys of the present invention as well as fatigue strength of strips of conventional alloys.

Results of the tests are shown in FIG. 1, and the conditions of the test are shown in Table 3.

It will be appreciated from FIG. 1 that the products of the present invention are superior in fatigue strength to the conventional products.

EXAMPLE 2

Alloy strips were obtained according to the same procedure as in Example 1, and each of the alloy strips was pressure-bonded to a steel back metal sheet to provide a bimetal material. The bimetal material was annealed at 300° to 400° C., and then was pressed and machined into a semicircular bearing having an inner diameter of 53 mm, a width of 17 mm and a bearing alloy layer thickness of 0.3 mm. Thus, the bearings of the present invention (Sample Nos. 1 to 19) and the conventional bearings (Sample Nos. 20 to 25) were obtained.

Incidentally, with respect to the steel back metal sheet, for example, a steel back metal sheet plated with Ni can be used, and it is not limited to this Example.

EXAMPLE 3

A surface layer (overlay) having a thickness of 20 μm was formed by conventional electroplating on the surface of each of semi-circular bearings obtained according to the same procedure as in Examples 1 and 2, thus preparing products of the present invention (Sample Nos. 1 to 19) and conventional products (Sample Nos. 20 and 23 to 25), which are shown in Table 2.

These bearings were tested for a fatigue resistance.

Figure 5:
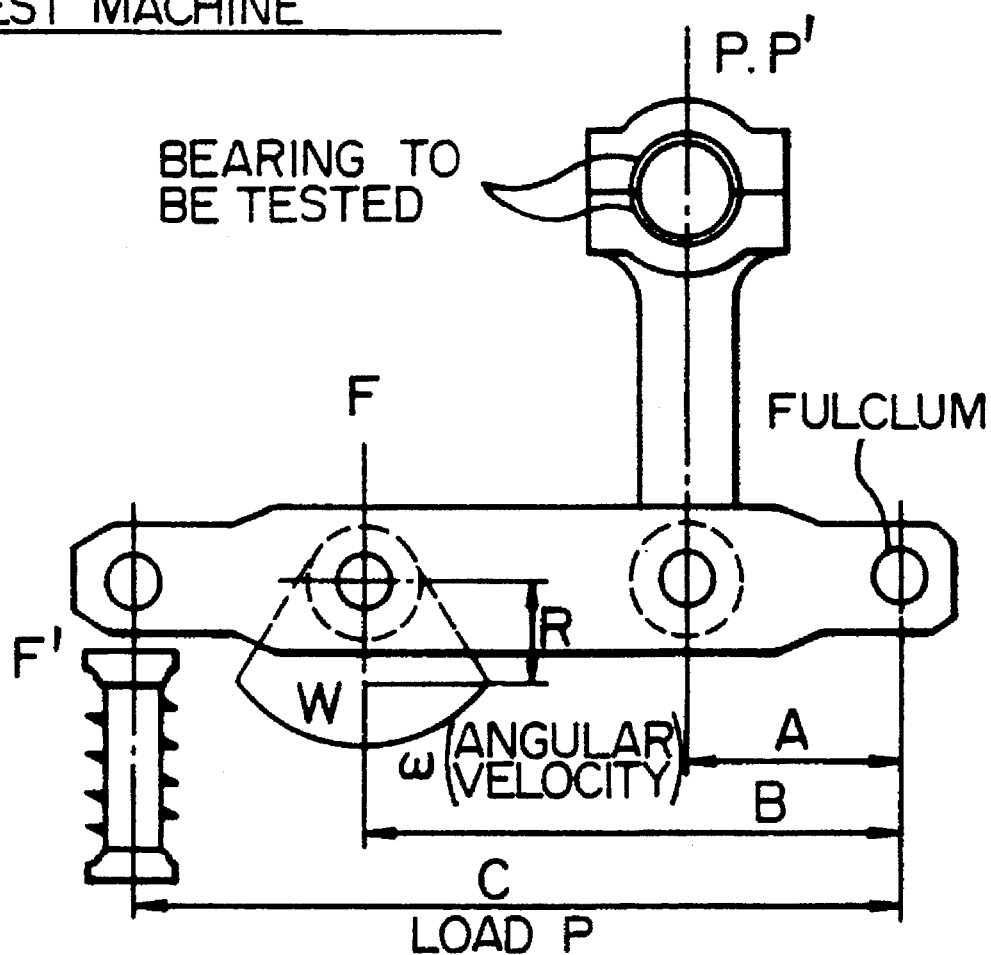
FIG. 5 is a schematic view of a fatigue test machine.

In the fatigue test shown in FIG. 5, an induction hardening material of JIS S55C was used as a shaft material, and the test was carried out under a forced lubricating condition at a shaft speed of 4000 rpm for 20 hours, and the fatigue load was measured. Results of this test are shown in FIG. 2, and the conditions of the test are shown in Table 4.

As is clear from the test results of FIG. 2, any of the products of the present invention is superior in fatigue strength to the conventional products.

TABLE 1

Alloy composition

| Kind | Sample No. | Al | Zn | Si | Cu | Pb | Mn | Mb | V | Ti | B | Sr | Ni | Co | Cr | Sn |
|---|---|---|---|---|---|---|---|---|---|---|---|---|---|---|---|---|
| Products of present invention | 1 | Balance | 1.5 |  | 2.0 | 1.0 | 0.20 | 0.40 | 0.15 | 0.08 | 0.02 |  |  |  |  |  |
|  | 2 | " | 2.0 |  | 2.0 | 1.2 | 0.30 | 1.00 | 0.30 | 0.08 | 0.02 |  |  |  |  |  |
|  | 3 | " | 4.0 |  | 1.2 | 1.2 | 0.30 | 0.40 | 0.15 | 0.16 | 0.04 |  |  |  |  |  |
|  | 4 | " | 4.0 |  | 1.0 | 2.0 | 0.50 | 0.50 | 0.30 | 0.15 | 0.05 |  |  |  |  |  |
|  | 5 | " | 6.0 |  | 0.7 | 3.0 | 1.00 | 0.30 | 0.12 | 0.30 | 0.10 |  |  |  |  |  |
|  | 6 | " | 6.0 |  | 1.2 | 1.5 | 0.20 | 0.50 | 0.15 | 0.20 | 0.10 |  |  |  |  |  |
|  | 7 | " | 8.0 |  | 0.8 | 1.5 | 0.15 | 0.40 | 0.40 | 0.05 |  |  |  | 0.1 | 0.1 |  |
|  | 8 | " | 8.0 |  | 0.5 | 1.0 | 0.50 | 0.20 | 0.15 | 0.08 | 0.02 |  |  |  |  |  |
|  | 9 | " | 8.0 |  | 0.8 | 1.2 | 0.15 | 0.10 | 0.12 | 0.08 | 0.02 |  | 0.4 |  |  |  |
|  | 10 | " | 2.0 | 1.5 | 2.0 | 1.2 | 0.20 | 0.40 | 0.15 | 0.15 | 0.05 |  |  |  |  |  |
|  | 11 | " | 2.0 | 2.0 | 1.2 | 1.2 | 0.15 | 0.30 | 0.12 | 0.20 | 0.10 |  |  |  | 0.20 |  |
|  | 12 | " | 2.0 | 5.0 | 0.8 | 1.0 | 0.40 | 0.50 | 0.15 | 0.20 | 0.10 | 0.40 | 0.25 |  |  |  |
|  | 13 | " | 4.0 | 3.0 | 1.2 | 1.0 | 0.40 | 0.50 | 0.12 | 0.10 | 0.03 |  |  |  |  |  |
|  | 14 | " | 4.0 | 6.0 | 1.5 | 1.0 | 0.30 | 0.40 | 0.15 | 0.15 | 0.05 | 0.1 |  |  |  |  |
|  | 15 | " | 6.0 | 2.0 | 0.8 | 1.0 | 0.25 | 0.40 | 0.12 | 0.15 | 0.06 |  |  | 0.20 |  |  |
|  | 16 | " | 6.0 | 5.0 | 1.0 | 1.2 | 0.20 | 0.20 | 0.15 | 0.20 | 0.10 | 0.20 | 0.10 | 0.10 |  |  |
|  | 17 | " | 8.0 | 1.0 | 0.8 | 1.2 | 0.15 | 0.20 | 0.12 | 0.15 | 0.05 |  |  |  |  |  |
|  | 18 | " | 8.0 | 3.0 | 1.0 | 1.2 | 0.15 | 0.20 | 0.12 | 0.12 | 0.03 |  |  |  |  |  |
|  | 19 | " | 8.0 | 6.0 | 1.2 | 1.2 | 0.20 | 0.20 | 0.12 | 0.12 | 0.03 |  |  |  |  |  |
| Conventional products | 20 | " |  |  | 1.2 |  |  |  |  |  |  |  | 1.0 |  |  | 6 |
|  | 21 | " |  |  | 1.0 |  |  |  |  |  |  |  |  |  |  | 20 |
|  | 22 | " |  | 2.5 | 0.7 | 1.7 |  |  |  |  |  |  |  |  |  | 12 |
|  | 23 | " | 5 | 1.5 | 1.0 | 1.0 |  | 0.50 |  |  |  |  |  |  |  |  |
|  | 24 | " | 4 | 6.0 | 1.2 | 1.0 |  | 0.50 |  |  |  | 0.1 |  |  |  |  |
|  | 25 | " | 3.5 | 3.0 | 0.8 | 1.0 |  |  |  |  |  |  |  |  |  |  |

TABLE 2

Sample bearings

| Kind | Sample No. | Bearing alloy layer No. | Overlay |
|---|---|---|---|
| Products of present invention | 1 | 1 | Pb-10Sn |
|  | 2 | 2 | Pb-10Sn |
|  | 3 | 3 | Pb-10Sn |
|  | 4 | 4 | Pb-10Sn |
|  | 5 | 5 | Pb-10Sn |
|  | 6 | 6 | Pb-10Sn |
|  | 7 | 7 | Pb-10Sn |
|  | 8 | 8 | Pb-10Sn |
|  | 9 | 9 | Pb-10Sn |
|  | 10 | 10 | Pb-10Sn |
|  | 11 | 11 | Pb-10Sn |
|  | 12 | 12 | Pb-10Sn |
|  | 13 | 13 | Pb-10Sn |
|  | 14 | 14 | Pb-10Sn |
|  | 15 | 15 | Pb-10Sn |
|  | 16 | 16 | Pb-10Sn |
|  | 17 | 17 | Pb-10Sn |
|  | 18 | 18 | Pb-10Sn |
|  | 19 | 19 | Pb-10Sn |
| Conventional products | 20 | 20 | Pb-10Sn |
|  | 21 | 21 | None |
|  | 22 | 22 | None |
|  | 23 | 23 | Pb-10Sn |
|  | 24 | 24 | Pb-10Sn |
|  | 25 | 25 | Pb-10Sn |

TABLE 3

Conditions of Fatigue Test (1)

| | |
|---|---|
| 1. Frequency for test | 30 Hz |
| 2. Waveform for test | Sinusoidal wave |
| 3. Temperature for test | R.T. |
| 4. Test machine | Shimazu Servo pulsar |
| 5. Evaluation | To measure a load when the sample is ruptured. |

TABLE 4

Condition of Fatigue Test (2)

| Items |  | Unit |
|---|---|---|
| Bearing size | 53 × 17 × t 1.5 (inside dia. × width × thickness) | mm |
| Rotation speed | 4000 | rpm |
| Circumferential speed | 11.1 | msec |
| Lubricating oil | SAE 20 | — |
| Inlet temperature | 120 | °C. |
| Lubricating oil pressure | 3.0 | Kgf/cm$^2$ |
| Lubricating method | shaft lubrication | — |
| Angle of advance | 36 | degree |
| Test time | 20 | Hour |
| shaft Material | S55C | — |
| Roughness | 1.0 | Rmaxμm |
| Hardness | not less than 55 | HRc |

As is clear from the test results of FIGS. 1 and 2, the sliding bearings obtained in accordance with the present invention have a more excellent fatigue resistance than the conventional bearings, and can fully achieve a bearing performance even under severe conditions of use as at high speed and under a high load.

What is claimed is:

1. An aluminum alloy bearing having superior fatigue strength under high temperature, high rotation speed and high load severe conditions and having a bearing alloy layer consisting of, by weight, 1 to 10% Zn, 0.1 to 5% Cu, 0.05 to 3% Mg, 0.1 to 2% Mn, 0.1 to 5% Pb, 0.1 to 2% V, 0.10 to 0.5% in total of Ti+B with at least 0.02% B and at least 0.08% Ti and with a part of said Ti+B being in the form of $TiB_2$, the balance Al and incidental impurities.

* * * * *